No. 713,265. Patented Nov. 11, 1902.
W. C. WHITNEY.
COMPUTING SPRING SCALE.
(Application filed Jan. 7, 1901. Renewed Apr. 22, 1902.)
(No Model.) 2 Sheets—Sheet 1.

Witnesses:
Raphaël Petter
Benjamin Miller

Inventor
William C. Whitney
Kerr, Page & Cooper Attys

No. 713,265. Patented Nov. 11, 1902.
W. C. WHITNEY.
COMPUTING SPRING SCALE.
(Application filed Jan. 7, 1901. Renewed Apr. 22, 1902.)

(No Model.) 2 Sheets—Sheet 2.

Witnesses:
Raphael Netter
Benjamin Miller

Inventor
William C. Whitney
Kerr, Page & Cooper
Att'ys

UNITED STATES PATENT OFFICE.

WILLIAM C. WHITNEY, OF NEWARK, NEW JERSEY, ASSIGNOR TO THE WILMORE COMPUTING SCALE COMPANY, OF NEWARK, NEW JERSEY, A CORPORATION OF NEW JERSEY.

COMPUTING SPRING-SCALE.

SPECIFICATION forming part of Letters Patent No. 713,265, dated November 11, 1902.

Application filed January 7, 1901. Renewed April 22, 1902. Serial No. 104,223. (No model.)

*To all whom it may concern:*

Be it known that I, WILLIAM C. WHITNEY, a citizen of the United States, residing at Newark, in the county of Essex and State of New Jersey, have invented certain new and useful Improvements in Computing Spring-Scales, of which the following is a specification, reference being had to the drawings accompanying and forming a part of the same.

The invention upon which my present application for patent is based is an improvement in computing-scales by means of which the weight and corresponding price in units of a predetermined value are simultaneously and automatically indicated.

The invention is applicable to scales of the general class represented by spring-balance or pendulum scales, and is more particularly designed for use in and as an improvement on the form of scale shown in United States patent to Swift, No. 563,246, dated June 30, 1896.

The improvement, as will be seen from the description and subjoined claims, resides in constructive features which render the apparatus more accurate and efficient and will be described in detail by reference to the accompanying drawings.

Figure 1:
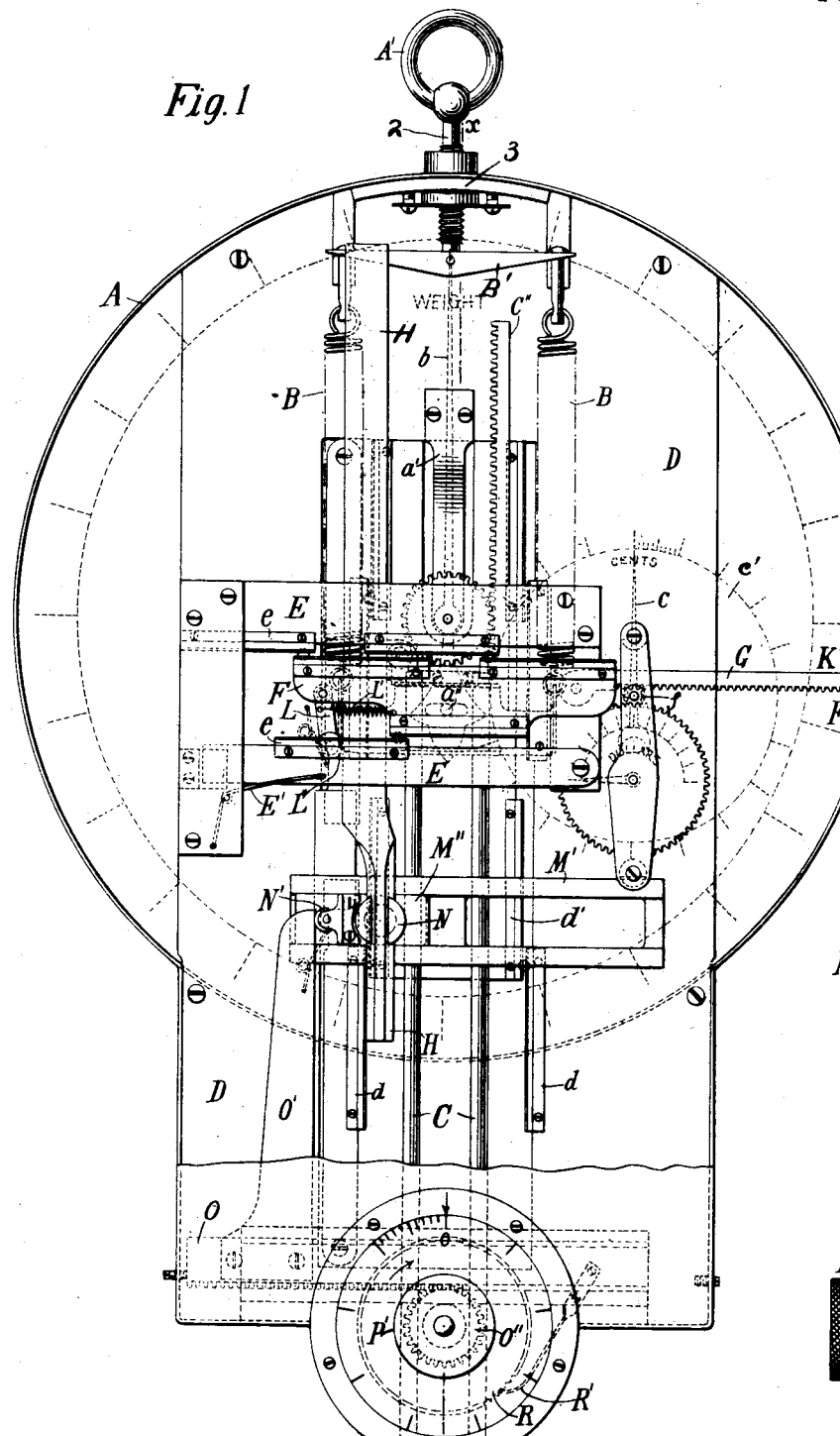
Figure 2:
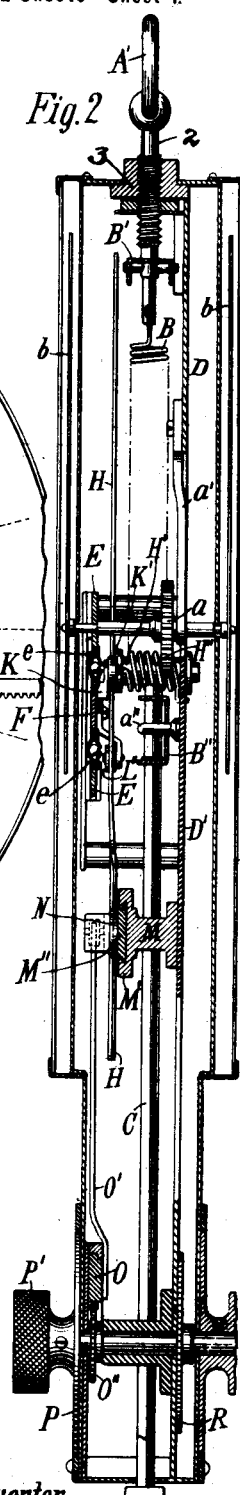
Figures 3, 4:
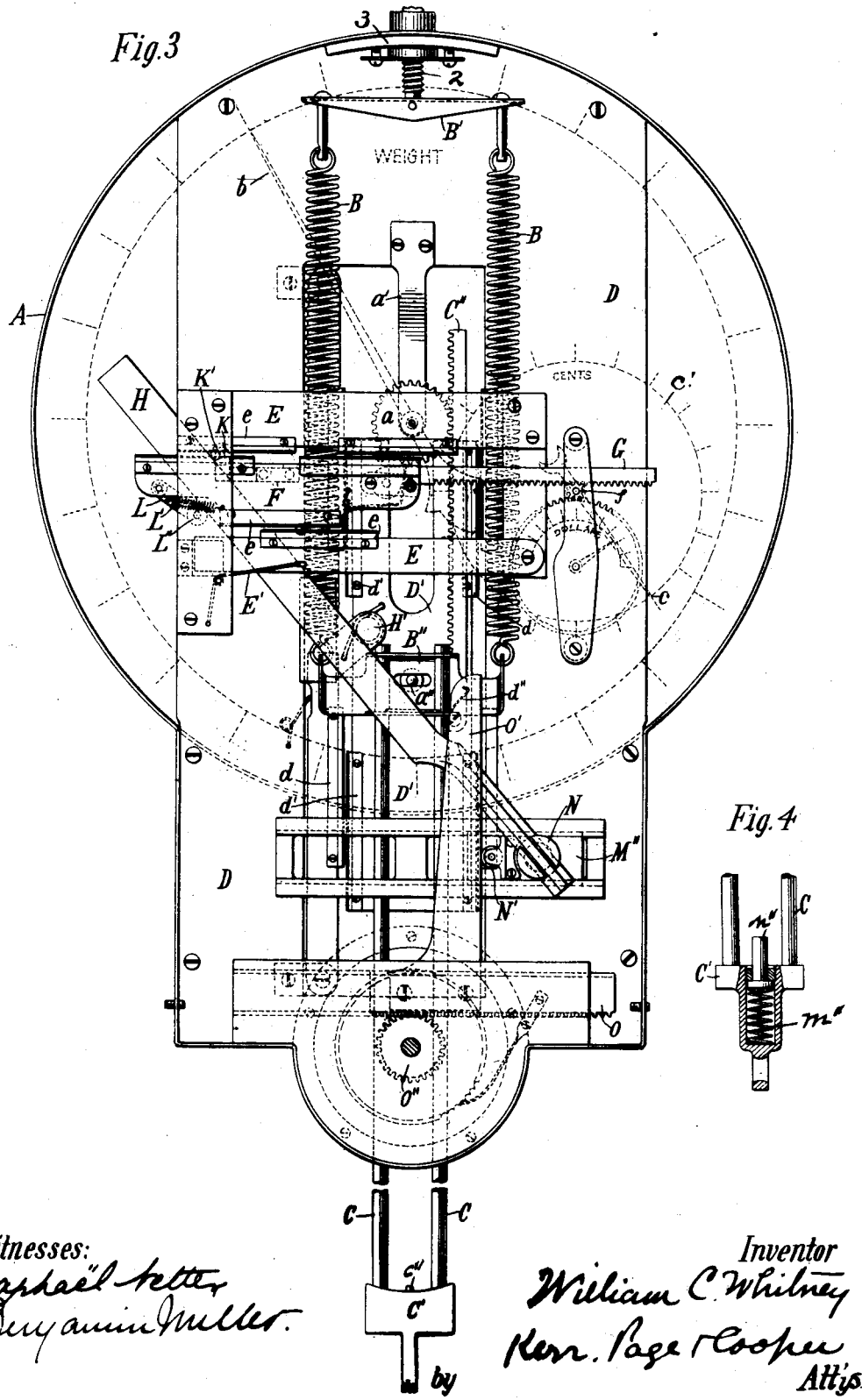

Figure 1 is a front elevation of my improved scale, the dials, face-plates, and pointers being indicated in dotted lines. Fig. 2 is a vertical section on the broken line $x\,x$ of Fig. 1. Fig. 3 is a similar view to Fig. 1, but showing the parts in different positions. Fig. 4 is a part-sectional view of a modified detail.

The operative parts of the scale are contained within a suitable case A, provided, preferably on both sides, with the usual weight and price indicating dials and having a suspension hook or ring A', which is secured to the casing in any desired manner—as, for instance, by a screw-threaded rod 2, to which the hook or ring is secured and which engages with the socket portion of an attaching-piece 3, secured to the inner side of the rim of the casing.

The weighing mechanism proper may be of widely-different forms, that shown consisting of a pair of spiral springs B, suspended from a yoke B', which may be supported by the rod 2 and connected to a head B'', to which latter two rods C C are secured, that extend down through the case and terminate in a block or head C', from which a suitable scale-pan is suspended.

In the casing of the apparatus is secured a metal plate D, which serves as a support for all of the stationary parts of the mechanism. This plate contains a central vertically-elongated opening, in which is arranged to slide a plate D'. In order to reduce the friction to a minimum, tracks or guides $d\ d'$ are formed on or attached to the edges of the stationary and movable plate, respectively, to serve as ways for antifriction balls or rollers, which guide the plate and permit it to slide up and down with very little friction. A pin $a''$ set in the plate D' projects through a slot in the head B'', so that the vertical motion of the head is imparted to the said plate and the motion of the latter is communicated to and indicated by a pointer or pointers $b$ through the instrumentality of a rack-bar C''', pivoted to the plate D' and held in engagement with a pinion $a$ by means of a light spring $d''$. The pinion $a$ is secured to a shaft or spindle suitably mounted—as, for instance, at one end in the end of an arm $a'$, and at the other end in the stationary plate E and carrying the pointer $b$, so that the latter is moved over the dial shown in dotted lines in proportion to the extension of the springs by the weight placed in the scale-pan.

The computing mechanism is independent of the weighing mechanism and is not affected when set at zero or no price, but is operated by the weighing mechanism to move a pointer $c$ over the price-indicating dial $c'$ when set to any value greater than zero. This computing mechanism is constructed and arranged for operation as described below.

At right angles to the line of travel of the plate D' and secured to the plate D are two plates E E, preferably forming the upper and lower sides of a rectangular frame. Between these plates there is arranged to slide a plate or carriage F, preferably and in order to avoid friction upon ball or roller bearings composed of suitable guides or ways $e\ e$ on the edges of the plates E and carriage F, respectively, and interposed steel balls, as shown in Fig. 2.

The lower plate E is pivoted at one end to the upright side of the frame, of which it forms a part, and is held in proper position by the force of a spring E', secured at one end to the stationary plate D and at the other to the plate E.

Pivoted to the carriage F is a rack-bar G, that engages with a pinion $f$ on the spindle of the price-indicating pointer $c$, which latter is arranged to sweep over a dial $c'$. The rotary movement of the pointer $c$, therefore, will correspond in extent to the lateral movement of the carriage F.

In order that the carriage may have a lateral movement proportional to the product of the price per unit of weight and the weight placed upon the scale-pan, the following mechanism is employed: A bar H is pivoted to a stud H', set in the sliding-plate D'. A spiral spring H" is connected at one end to this stud and at the other to the bar H, exerting thereon a force tending to maintain said bar in a vertical position.

A sliding connection between the carriage and the bar is provided, consisting, preferably, of a stationary stud K, set in the plate and carrying a roller K', that bears on one edge of the bar, and a pivoted arm L, acted upon by a spring L' and carrying a roller L", that bears against the opposite edge of said bar.

The normal or initial position of the carriage is such that when the bar is vertical the carriage is not displaced by the movement of said bar; but if the bar be set at an angle then its movement due to the vertical movement of the plate D' displaces the carriage, imparting thereto a lateral movement proportional to the angle by which the bar is displaced from the vertical.

In order to provide for setting the bar H at any desired angle, there is secured to the plate D' by means of a stud M a horizontal guide M', in which is mounted a carrier-block M". In said block there is mounted a rotary stud N, having in its end a transverse groove, through which the bar H passes and slides freely. A roller N' is also mounted on the carrier M" to afford a bearing for the device which shifts the said carrier to the desired position. This latter device comprises a sliding rack-bar O, carrying a vertical standard O' and engaging with a pinion O". The pinion is on a spindle carrying a graduated dial P and a knob P', by which the dial is turned through the desired angle to bring the price unit in register with an initial mark, and at the same time the rack-bar and standard O' are shifted to impart the corresponding angular position to the bar H.

In order to facilitate the setting of the dial, it carries a ratchet R, with which engages a spring-pawl R', that imparts a slight resistance to the motion of the ratchet in either direction. The teeth of the ratchet correspond in number and position with the graduations on the dial.

As thus constructed and organized the apparatus is used as follows: When a given article is to be weighed and its price computed, the dial P is turned to bring the unit price in register with the initial mark or zero-point. This shifts the carrier-block M" along its guide and sets the bar H at a given angle. Then when the weight is placed in the scale-pan the plate D' is drawn down, carrying with it the pivotal support of the bar H. This movement, since the angle of the bar is fixed, draws back the carriage F and turns the price-indicator to the corresponding division of the price-scale. As the edge of the standard O' is vertical it offers very slight resistance to the movement of the roller N', and as both the vertically-moving plate D' and laterally-moving carriage F are provided with antifriction-bearings the greatest possible degree of accuracy is secured. As will be seen by a comparison of the scale above described with that of the Swift patent above referred to, and which for purposes of this case may be considered as defining the general conditions of the prior art, the invention which the present application discloses is in the improved device for setting the bar or angular member H' for communicating lateral motion to the carriage F and in other structural details.

It has been found in practice that users of scales of this kind often carelessly remove from the pan an article whose weight has been determined and leave the pan free to rise under the action of the spring. It is usual to provide a stop, as $c''$, on the head C', which strikes against the casing or frame of the scale when the weight is thus suddenly removed; but the momentum sometimes results in injury to some of the more delicate parts, particularly the pointer $b$. In order to avoid this, I form in the head C' a socket, as shown in Fig. 4, in which is a pin $n''$, retained in the socket by a flange and seated on a spring $m''$. Normally this pin is held against the bottom of the casing by the force of the mainsprings B and with the spring $m''$ under compression, and it serves as a yielding stop that cushions the force of the impact and prevents injury to or derangement of the apparatus.

What I therefore claim is—

1. In a computing spring-scale the combination with a vertically-moving part connected with the weighing mechanism, of computing mechanism comprising a pivoted angularly-adjustable member, a laterally-movable part engaging with said member, and a laterally-movable vertical standard engaging with one arm of the angular member and adapted to set and maintain the same at the desired angle, as set forth.

2. In a computing spring-scale, the combination with a body movable vertically and connected with the head of the weighing mechanism, of computing mechanism comprising an angularly-adjustable pivoted bar, a transversely-movable carrier on the said body, having a sliding connection with one end of the bar, and a transversely-adjustable vertical standard on the frame or case of the scale adapted to engage with the said carrier, as set forth.

3. In a computing spring-scale, the combination with a vertically-movable plate connected with the head of the weighing mechanism, of a computing mechanism comprising an angularly-adjustable bar, a carrier adapted to travel horizontally in a support on said plate, a sliding swivel connection between the carrier and the bar, a vertical standard transversely adjustable on the frame or case of the scale, and adapted to engage with the carrier, and a laterally-movable plate or carriage in sliding engagement with the bar, as set forth.

4. In a computing spring-scale, the combination with the weighing mechanism of a carriage connected with a suitable price-indicating device, and movable laterally, a bar pivoted to a part movable with the head of the weighing mechanism, means for setting said bar at different angles according to a predetermined unit price, and a connection between the carriage and the bar comprising a bearing fixed on the carriage on one side of the bar and a spring-actuated bearing on the other, as set forth.

5. The combination with the bar H, carried by a part connected with the head of the weighing mechanism, price-indicating devices connected with and controlled by the said bar, and means for setting the bar in different angular positions comprising a horizontal rack-bar having a vertical arm and a pinion for moving said rack-bar, as set forth.

WILLIAM C. WHITNEY.

Witnesses:
WILLIAM H. SANDERSON,
HENRY F. GIERE.